(12) United States Patent
Wilson

(10) Patent No.: US 11,716,941 B2
(45) Date of Patent: *Aug. 8, 2023

(54) METHOD OF REMOVING SYNTHETIC TURF AND SYNTHETIC TURF REMOVAL ATTACHMENT

(71) Applicant: Troy Wilson, Saegertown, PA (US)

(72) Inventor: Troy Wilson, Saegertown, PA (US)

( * ) Notice: Subject to any disclaimer, the term of this patent is extended or adjusted under 35 U.S.C. 154(b) by 274 days.

This patent is subject to a terminal disclaimer.

(21) Appl. No.: 16/102,907

(22) Filed: Aug. 14, 2018

(65) Prior Publication Data

US 2018/0352756 A1 Dec. 13, 2018

Related U.S. Application Data

(63) Continuation of application No. 13/923,298, filed on Jun. 20, 2013, now Pat. No. 10,117,386.

(51) Int. Cl.
| | | |
|---|---|---|
| *A01G 20/12* | (2018.01) | |
| *E01C 13/08* | (2006.01) | |
| *A01G 20/18* | (2018.01) | |

(52) U.S. Cl.
CPC ............ *A01G 20/12* (2018.02); *A01G 20/18* (2018.02); *E01C 13/08* (2013.01)

(58) Field of Classification Search
CPC ........ A01G 20/12; A01G 20/00; A01G 20/10; A01G 20/18; E01C 13/08
See application file for complete search history.

(56) References Cited

U.S. PATENT DOCUMENTS

| | | |
|---|---|---|
| 1,179,795 A | 4/1916 | Beaupre et al. |
| 2,155,879 A | 4/1939 | Washbum et al. |
| 2,646,740 A * | 7/1953 | Verner .................. A01G 20/12 |
| | | 172/19 |
| 2,830,775 A | 4/1958 | Kiesel |
| 3,039,710 A | 6/1962 | Walter |
| 3,201,944 A | 8/1965 | Christensen et al. |
| 3,643,885 A | 2/1972 | Keesling et al. |
| 3,812,918 A | 5/1974 | Beck et al. |
| 4,049,060 A | 9/1977 | Hoke et al. |
| 4,354,556 A | 10/1982 | Evans et al. |
| 4,809,921 A | 3/1989 | Dueck et al. |

(Continued)

FOREIGN PATENT DOCUMENTS

| | | |
|---|---|---|
| CN | 1599649 A | 3/2005 |
| DE | 202012012727 U1 | 11/2013 |

(Continued)

OTHER PUBLICATIONS

American Turf Installers, www.americanturfinstallers.com/about1.html, Retrieved from Wayback Machine Aug. 12, 2013 (see attached).*

(Continued)

*Primary Examiner* — Jessica H Lutz
(74) *Attorney, Agent, or Firm* — The Webb Law Firm

(57) ABSTRACT

A turf removal attachment is bolted to a skid steer to allow hydraulic motors thereon to first power cutting blades to form easily removable strips of turf and then, on a lower gear ratio, the drum to which roller tines are attached to spool the strips of turf. Hydraulic circuitry is provided to permit the hydraulic fluid of the skid steer to power the turf removal tools on the turf removal attachment.

11 Claims, 4 Drawing Sheets

(56) References Cited

U.S. PATENT DOCUMENTS

| | | | |
|---|---|---|---|
| 4,830,304 | A | 5/1989 | Fuke et al. |
| 4,892,153 | A * | 1/1990 | Cooling ................. A01G 20/12 172/20 |
| 5,437,528 | A | 8/1995 | Decker et al. |
| 6,112,825 | A | 9/2000 | Hutchison et al. |
| 6,131,668 | A * | 10/2000 | Houska ................. A01G 20/12 172/253 |
| 6,135,211 | A | 10/2000 | Schroeder et al. |
| 6,299,094 | B1 | 10/2001 | James et al. |
| 6,347,670 | B1 | 2/2002 | Miskin et al. |
| 6,393,814 | B1 | 5/2002 | Gorey et al. |
| 6,769,495 | B1 | 8/2004 | VanLoen et al. |
| 9,491,897 | B2 | 11/2016 | Owegeser |
| 9,868,605 | B2 * | 1/2018 | Bishop ................... B65H 18/22 |
| 2002/0144825 | A1 | 10/2002 | Bass et al. |
| 2002/0179308 | A1 | 12/2002 | deVries et al. |
| 2003/0037984 | A1 | 2/2003 | McPherson et al. |
| 2003/0089002 | A1 | 5/2003 | Bares et al. |
| 2003/0136565 | A1 | 7/2003 | Peterson et al. |
| 2004/0040725 | A1 | 3/2004 | Stevens et al. |
| 2004/0251373 | A1 | 12/2004 | Denker et al. |
| 2010/0314482 | A1 | 12/2010 | Merkt et al. |
| 2010/0319510 | A1 | 12/2010 | Bearden et al. |
| 2011/0042111 | A1 | 2/2011 | Pugh et al. |
| 2011/0073701 | A1 | 3/2011 | Ford et al. |
| 2012/0067996 | A1 * | 3/2012 | Motz ...................... A01G 20/10 242/416 |
| 2013/0186314 | A1 | 7/2013 | Carlson et al. |
| 2013/0189057 | A1 | 7/2013 | Motz et al. |
| 2014/0291433 | A1 * | 10/2014 | Owegeser .............. A01G 20/12 242/403 |
| 2014/0305669 | A1 | 10/2014 | Owegeser |

FOREIGN PATENT DOCUMENTS

| | | | | |
|---|---|---|---|---|
| DE | 202013101350 | U1 * | 8/2014 | ............. A01G 20/12 |
| JP | S59212344 | A | 12/1984 | |
| JP | 2006282395 | A | 10/2006 | |
| WO | 2008064166 | A3 | 5/2008 | |
| WO | 2009053092 | A1 | 4/2009 | |

OTHER PUBLICATIONS

Defendant's Amended Answer, Affirmative Defensesand Counterclaims re U.S. Pat. No. 10,117,386, Mar. 11, 2020.
Amended Complaint re U.S. Pat. No. 10,117,386, Jul. 6, 2020.
Declaration of Troy Wilson Under 37 C.F.R. § 1.132, Apr. 25, 2022, 3 pages.
Photo Album of Bobcat Sod Layer, 17 pages.
Photo Album of Device at Slippery Rock University, 2012, 2 pages.
Photo Album of Ingersoll Rand Sod Layer, 8 pages.
"New Polytan football turf for the Bulls Arena in Salzburg", Jun. 2009, accessed Nov. 19, 2020, 3 pages.
SMG Equipment, LLC, Non-infringement and Invalidity Contentions re U.S. Pat. No. 10,117,386, Nov. 20, 2020, 107 pages.
SMG Equipment, LLC, Product Catalog 2010-2011, 158 pages.
Documentation of work for Slippery Rock University, 2012, 61 pages.
TPK, Inc., Disclosure of Non-infringement and Invalidity Contentions, Nov. 25, 2020, 13 pages.
SMG Equipment, LLC, TurfSaw TS350 Brochure, Oct. 2012, 2 pages.
SMG Equipment, LLC, TurfWinch TW2500 Brochure, Oct. 2012, 2 pages.
SMG Equipment, LLC, "SMG TurfSawTurfWinch Combi", Mar. 22, 2013, [Retrieved from the Internet: May 25, 2022], URL <https://www.youtube.com/watch?v=I8rOeqmMa9s>, 1 page.
SMG Equipment, LLC, "SMG Prototype TurfMuncher TM2000D 'Brunhilde'", Aug. 1, 2013, [Retrieved from the Internet: May 25, 2022], URL <https://www.youtube.com/watch?v=ouDTsQRbSBM>, 1 page.
SMG Equipment, LLC, "SMG TurfWinch TW2000", Apr. 8, 2019, [Retrieved from the Internet: May 25, 2022], URL <https://www.youtube.com/watch?v=5XSUVdQV2QE>, 1 page.
TRSturf, "Synthetic Turf Removal at University of Cincinnati by TRS", Jun. 26, 2012, [Retrieved from the Internet: May 26, 2022], URL <https://www.youtube.com/watch?v=veVllrDzdt4>, 1 page.
WashU Bears, "2012 Turf Removal", May 22, 2012, [Retrieved from the Internet: May 26, 2022], URL <https://www. youtube.com/watch?v=B85AbBEbXSA>, 1 page.
Basepros, "Artificial Turf Removal", Aug. 14, 2010, [Retrieved from the Internet: May 26, 2022], URL <https://www.youtube.com/watch?v=9rOxZM5u2ug>, 1 page.
Bobcat Company, "Bobcat Sod Layer Attachment", Nov. 13, 2009, [Retrieved from the Internet: May 26, 2022], URL <https://www.youtube.com/watch?v=GISU-za4edM>, 1 page.

* cited by examiner

METHOD OF REMOVING SYNTHETIC TURF AND SYNTHETIC TURF REMOVAL ATTACHMENT

This application is a continuation of U.S. application Ser. No. 13/923,298 filed Jun. 20, 2013, now U.S. Pat. No. 10,117,386, which is hereby incorporated by reference in its entirety. U.S. Provisional Patent Application No. 61/660,781, is incorporated herein by reference in its entirety.

BACKGROUND AND SUMMARY OF THE INVENTION

The present invention is directed to an attachment for a skid steer to facilitate removal of artificial turf. While the terminology "skid steer" is used throughout this specification and claims, it will be appreciated that other self-powered vehicles may be used as well and that it is intended that the term "skid steer" include any and all such vehicles.

Warranties on artificial turf typically expire at the 10$^{th}$ anniversary of installation. Most stadium owners/operators seek to remove and replace their turf fields as that important anniversary approaches in order to avoid any possible legal liability for injuries resulting from a defective surface.

Before a new surface can be installed, the old has to be taken up. Removal of an existing synthetic turf, whether it is for baseball, football, soccer or other use, is difficult and time consuming. The resultant rolls of turf are extremely heavy and, depending on size, can weigh between 3000 and 6000 pounds. Sloppy rolls are more difficult to handle and take up more space in dumpsters or other disposal bins.

Most turf removal projects are performed manually requiring significant manpower (10-12 personnel) and requiring almost an entire week. Existing automated removal equipment is expensive, and, in some cases is difficult to use, has low power and, accordingly, takes several days to accomplish the removal process. Due to the inefficiency and the excessive expense, most removal teams opt to revert to manual removal methods.

It is the object of the present invention to provide a less expensive mechanical alternative which permits removal to be accomplished in 1-1½ days by a single operator, if need be. Further, with the turf removal attachment of the present invention, a tight roll requiring less space and, accordingly, fewer disposal bins, is achieved.

The present invention comprises a synthetic turf removal attachment adapted to be secured to and powered by a skid steer, the removal attachment including: a) a C-shaped frame having a spine with first and second arms extending laterally from first and second longitudinal end portions of the spine, the first and second spaced arms adapted to support turf removal tools; b) first and second motors for powering the turf removal tools mounted on the first and second spaced arms, respectively; c) at least one attachment to a source of energy, the at least one attachment being mounted on the spine, the source of energy adapted to supply power to the first and second motors.

Preferably the first and second motors comprise hydraulic motors for powering the turf removal tools. The removal attachment includes a supply system for providing hydraulic fluid from a single hydraulic source, the supply system including a splitter valve to divide a fluid stream from the single hydraulic source to ensure equal force is applied to both of the first and second hydraulic motors. Quick couplers are provided to attach the supply system to a remote hydraulic source on the skid steer being used to manipulate the turf removal attachment. In addition, a pair of cutting blades are provided, each one of the pair being attachable to the first and second arms for energization by said first and second motors, respectively, to slice an artificial turf surface into manageable strips. First and second cutter shoes partially surround the first and second cutter blades and first and second blade guards overlie a top portion of the first and second cutter blades, respectively.

The turf removal tools further include a pair of roller tines, one each of the roller tines being attachable to the first and second arms, respectively, and being powered by the first and second motors to roll up the sliced turf strips. The removal attachment includes first and second slidable mounts supporting the first and second arms on the first and second ends of the spine, respectively, and further comprising first and second hydraulic rams to move the first and second arms laterally relative to the first and second longitudinal ends of the spine along the first and second slidable mounts, respectively. Further the removal attachment includes first and second height-adjustable wheels rotatably mounted to the first and second longitudinally extending arms, respectively.

Various other features, advantages, and characteristics of the present invention will become apparent after a reading of the following detailed description.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF THE PREFERRED EMBODIMENT(S)

Figure 1:
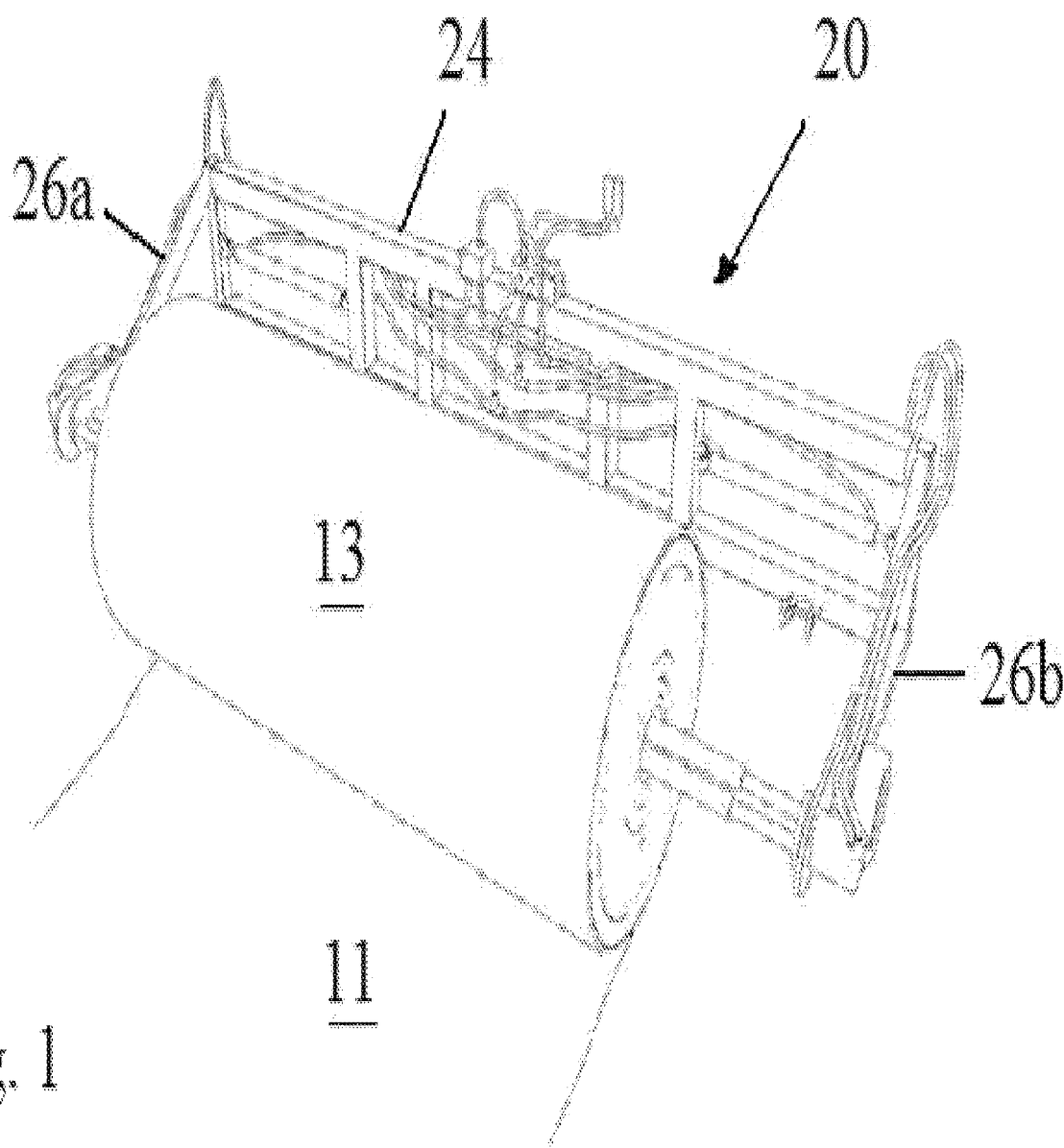
FIG. 1 is a partial perspective front view of a first embodiment of the turf removal attachment of the present invention showing a partial turf roll thereon.
Figure 4:
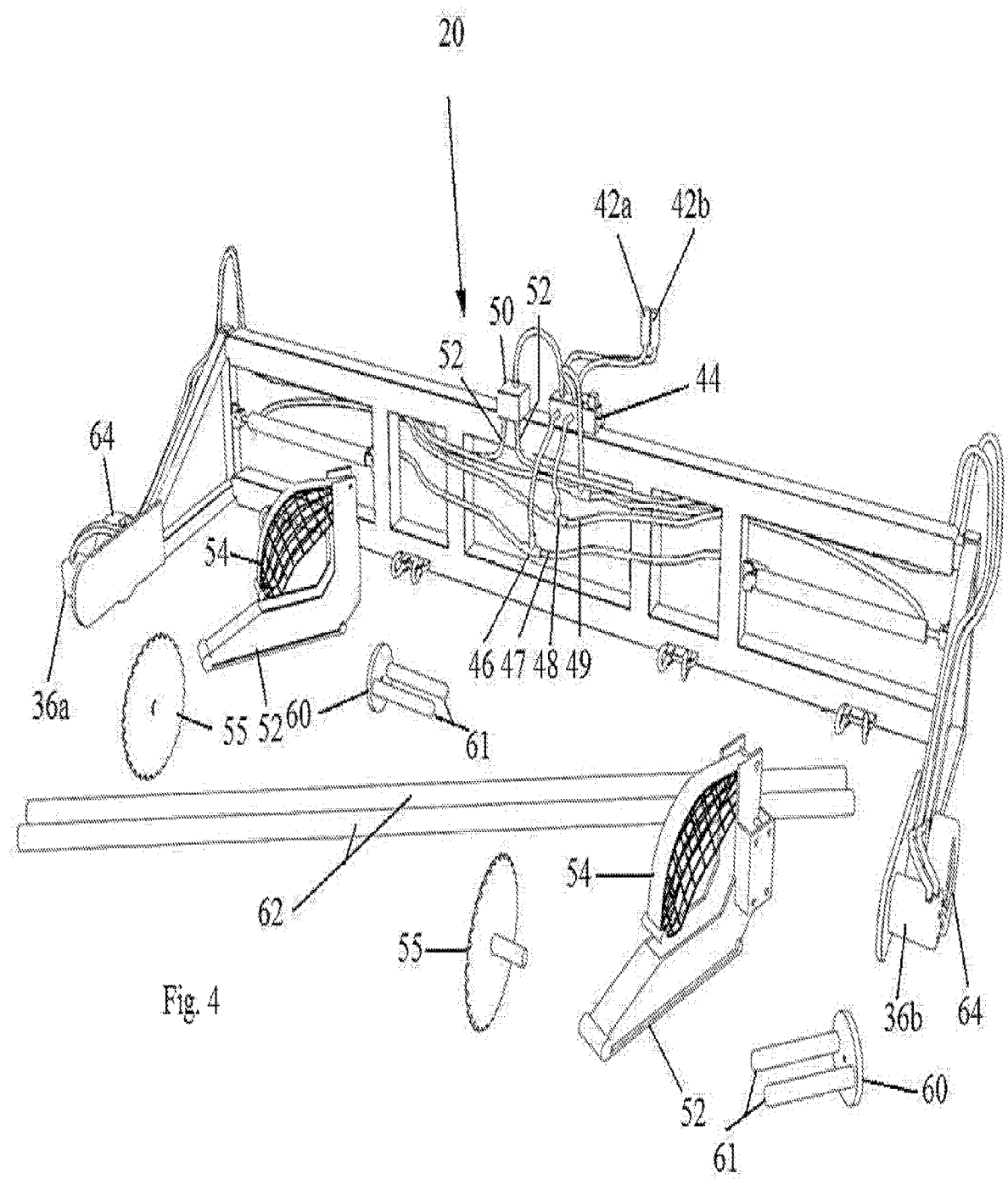
FIG. 4 is an exploded perspective view of the turf removal attachment of the present invention.

A first embodiment of the of the present invention is depicted in FIGS. 1 and 4 generally at 20. Turf removal attachment 20 includes a frame featuring a longitudinal spine 24 and two laterally extending arms 26a and 26b. Arms 26a and 26b are connected to spine 24 by means of slidable mounts 28a, 28b (FIG. 4) which telescope into the longitudinal ends 27a, 27b of spine 24, respectively. Hydraulic rams 30a, 30b move arms 26a, 26b in and out for the dual purposes of adjusting the width of the cut of the strip of turf 11 and to permit release of the turf roll 13 once a strip has been completely rolled. Mounting plate 32 is attached to the outside of spine 24 and allows the turf removal attachment 20 to be bolted to the front of a skid steer using the conventional attachment bolts associated therewith through holes 34.

Arms 26a and 26b have first and second motors 36a, 36b mounted thereon for powering turf removal tools which can be mounted thereon. Preferably, motors 36a, 36b are preferably hydraulic motors which receive hydraulic fluid from a source found on the skid steer (not shown). The hydraulic circuit 40 which makes this possible includes hydraulic quick couplers 42a, 42b which connect to the output and return lines from the hydraulic pump on the skid steer;

electric over hydraulic valve assembly 44; first T-connector 46 for hydraulic lines 47 to extend hydraulic rams 30*a*, 30*b* and second T-connector 48 for hydraulic lines 49 to retract hydraulic rams 30*a*, 30*b*; hydraulic flow divider 50 to ensure equal flow through hydraulic lines 52 to power motors 36*a*, 36*b*.

Figure 2:
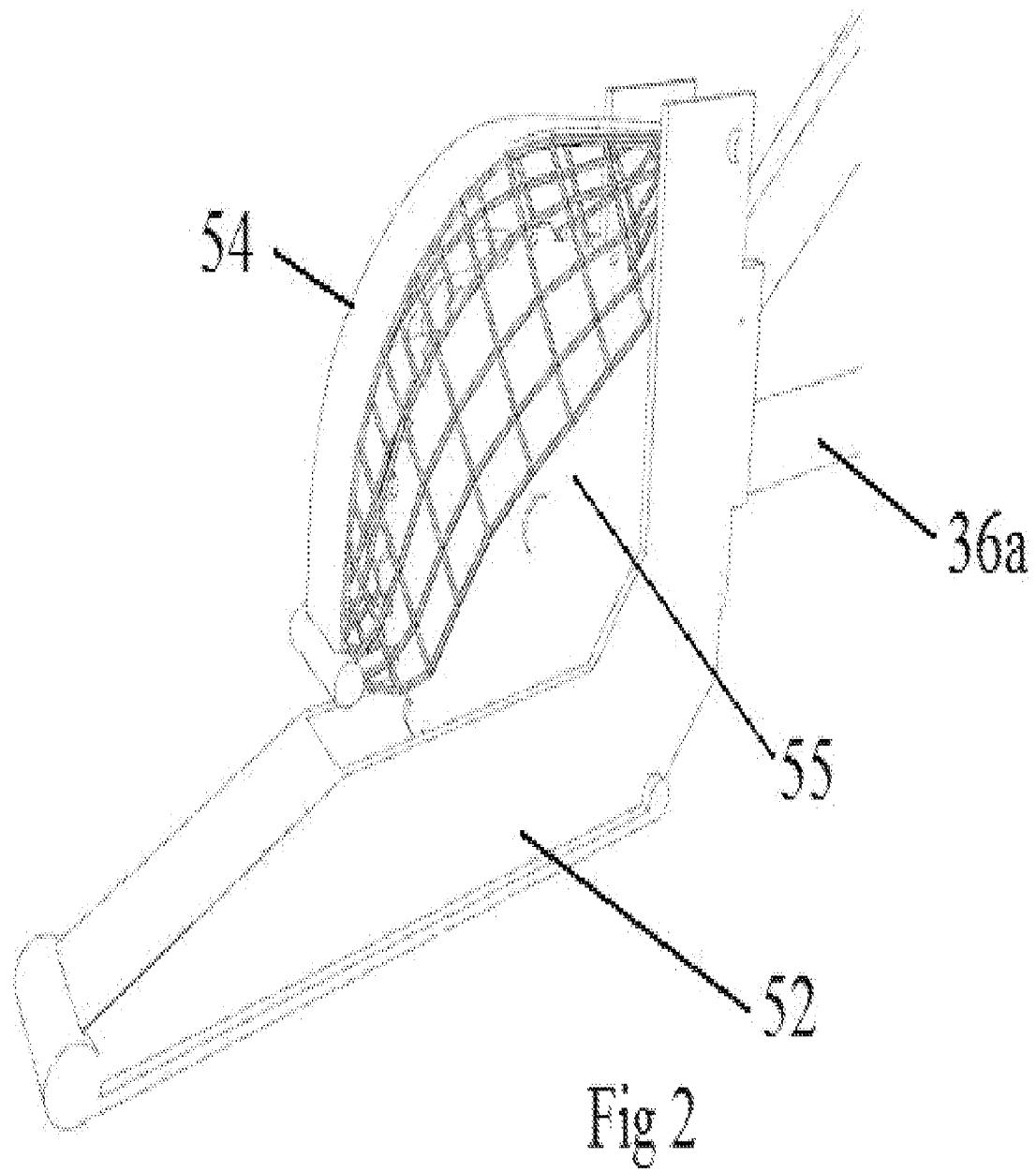
FIG. 2 is a front perspective view of a cutter shoe and blade guard of the present invention.
Figure 3:
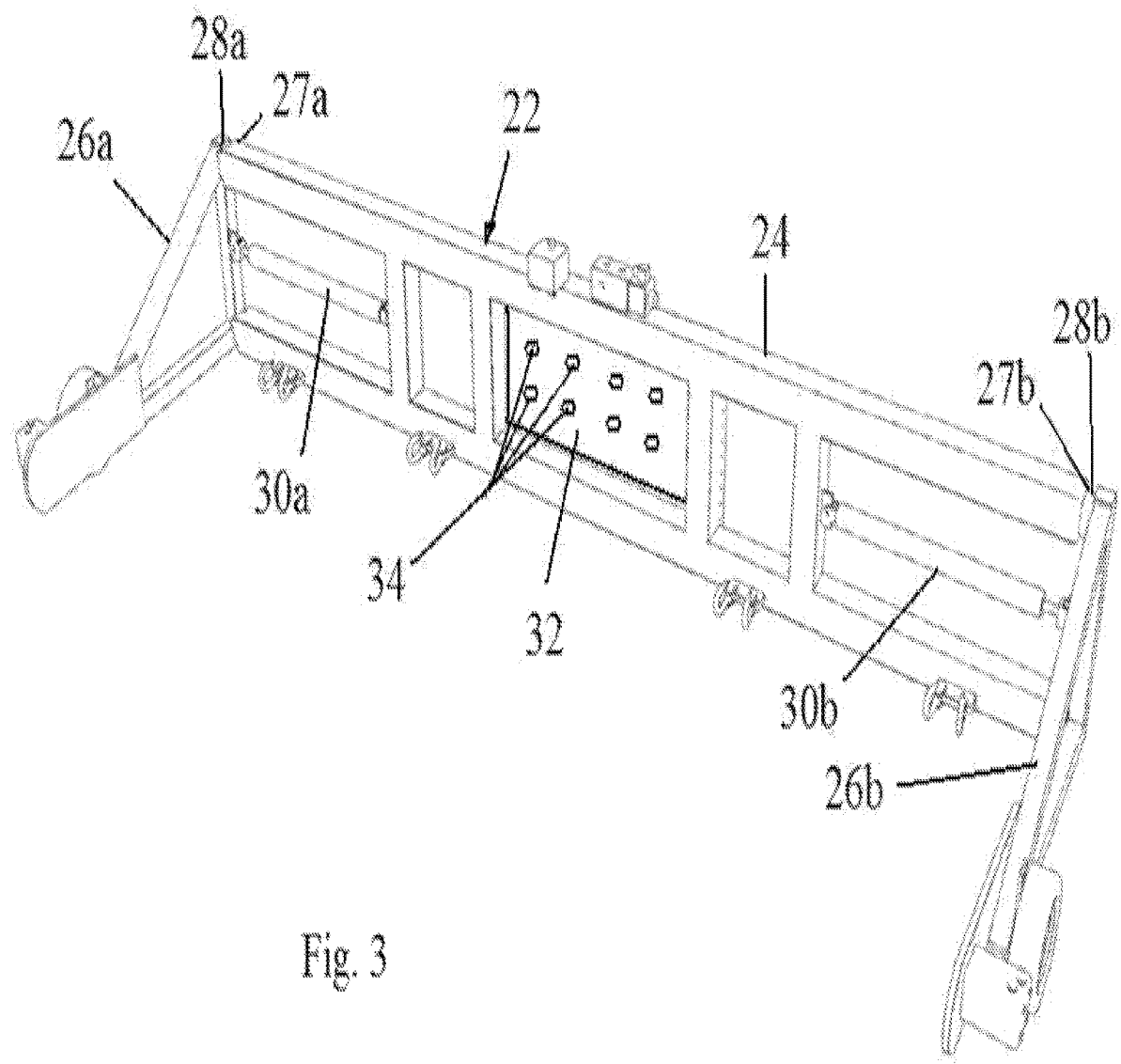
FIG. 3 is a front perspective view of the frame of first embodiment.

FIG. 2 depicts a cutter shoe 52 and blade guard 54 which surround turf cutting blade 55 and protect it (and personnel) against contact with foreign materials. Cutting blades 55 are connected to arms 26*a*, 26*b* in such a manner as to permit them to be powered by hydraulic motors 36*a*, 36*b* and shoes 52 attached to arms 26*a*, 26*b* so that they are just above or minimally contact the surface of turf 11.

Additional turf removal tools are depicted in FIG. 4 and include a pair of roller tines 60 which support roller pipes 62. Roller tines 60 can either have dual arms 61 as shown in FIG. 4 or can alternatively feature two sets of two, or four arms on each tine 60. In either case, tines are spaced in such a manner that roller pipes 62 (FIG. 1) grasp the lead end of turf 11 as roll formation is initiated and maintain a hold on the turf to avoid slippage ensuring a tight roll 13 is formed. Wheels 64 can be height adjusted to accommodate the particular features (thickness, etc.) of the synthetic turf field with which it is used. While the turf removal attachment 20 of the present invention may be made in whatever size desired, a preferred embodiment is capable of cutting turf 11 into strips having widths of 7.5 to 15 feet (2.5-5 yards).

Various changes, alternatives, and modifications will become apparent to a person of ordinary skill in the art after a reading of the foregoing specification. It is intended that all such changes, alternatives, and modifications as fall within the scope of the appended claims be considered part of the present invention.

I claim:

1. A method of removing synthetic turf, comprising:
   providing a synthetic turf removal attachment configured to attach to a skid steer, the synthetic turf removal attachment comprising,
   (a) a frame, comprising:
      (i) a vertically oriented transverse component;
      (ii) a first arm extending substantially orthogonally from a first distal end of the transverse component; and
      (iii) a second arm extending substantially orthogonally from a second distal end of the transverse component, wherein the first distal end is on the opposite end of the transverse component from the second distal end;
   (b) a first removable turf removal tool connected to a distal end of the first arm;
   (c) a second removable turf removal tool connected to a distal end of the second arm;
   (d) a first hydraulic motor operably coupled to the first turf removal tool;
   (e) a second hydraulic motor operably coupled to the second turf removal tool;
   (f) a hydraulic system, comprising:
      (i) a first hydraulic quick coupler capable of being operably connected to an output port of an external source of hydraulic fluid and operably connected to a valve assembly;
      (ii) a second hydraulic quick coupler capable of being operably connected to a return port of the external source of hydraulic fluid and operably connected to the valve assembly, wherein the external source of hydraulic fluid capable of being operably connected to by the first and second hydraulic quick couplers is a hydraulic system of the skid steer; and
      (iii) the valve assembly operably connected to the first hydraulic motor and the second hydraulic motor; and
   (g) a mounting plate attached to a rear face of the transverse component permitting attachment of the synthetic turf removal attachment to the skid steer;
   attaching the synthetic turf removal attachment to the skid steer; and
   removing the synthetic turf.

2. The method of claim 1, wherein removing the synthetic turf is performed within a range from about 1 day to about 1.5 days.

3. The method of claim 1, wherein removing the synthetic turf is performed in up to 1.5 days.

4. The method of claim 1, wherein the first and second removable turf removal tools are turf rolling tools or turf cutting tools.

5. The method of claim 4, wherein each of the turf rolling tool comprises a pair of roller tines, the roller tines configured to roll up the synthetic turf.

6. The method of claim 4, wherein each of the turf cutting tool comprises a turf cutting blade, a cutter shoe, and a retractable blade guard, wherein the retractable blade guard covers the turf cutting blade when not in use, and wherein the turf cutting tool is configured to cut the synthetic turf into strips.

7. The method of claim 6, wherein the strips have a width from about 7.5 feet to about 15 feet.

8. The method of claim 1, wherein the synthetic turf removal attachment further comprises a first height-adjustable wheel rotatably mounted to the first arm and a second height-adjustable wheel rotatably mounted to the second arm.

9. The method of claim 8, wherein the first and second height-adjustable wheels are configured to adjust to a thickness of the synthetic turf.

10. The method of claim 1, wherein the method is performed by one or more operators.

11. A synthetic turf removal attachment configured to attach to a skid steer, comprising:
   (a) a frame, comprising:
      (i) a vertically oriented transverse component;
      (ii) a first arm extending substantially orthogonally from a first distal end of the transverse component; and
      (iii) a second arm extending substantially orthogonally from a second distal end of the transverse component, wherein the first distal end is on the opposite end of the transverse component from the second distal end;
   (b) a first removable turf removal tool connected to a distal end of the first arm;
   (c) a second removable turf removal tool connected to a distal end of the second arm;
   (d) a first hydraulic motor operably coupled to the first turf removal tool;
   (e) a second hydraulic motor operably coupled to the second turf removal tool;
   (f) a hydraulic system, comprising:
      (i) a first hydraulic quick coupler capable of being operably connected to an output port of an external source of hydraulic fluid and operably connected to a valve assembly;

(ii) a second hydraulic quick coupler capable of being operably connected to a return port of the external source of hydraulic fluid and operably connected to the valve assembly, wherein the external source of hydraulic fluid capable of being operably connected to by the first and second hydraulic quick couplers is a hydraulic system of the skid steer; and (iii) the valve assembly operably connected to the first hydraulic motor and the second hydraulic motor; and (g) a mounting plate attached to a rear face of the transverse component permitting attachment of the synthetic turf removal attachment to the skid steer.

\* \* \* \* \*